March 31, 1953   A. S. BERG ET AL   2,633,522
DEVICE FOR HEATING GLASS PIPE
Filed Feb. 7, 1950
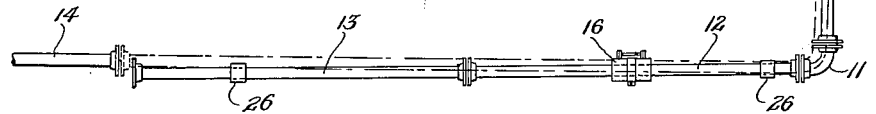
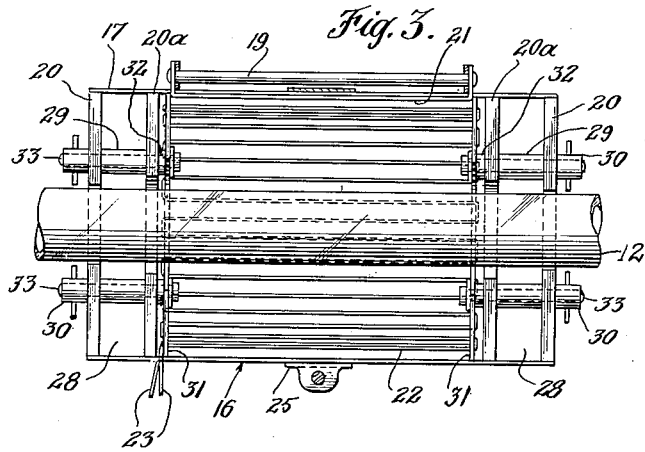
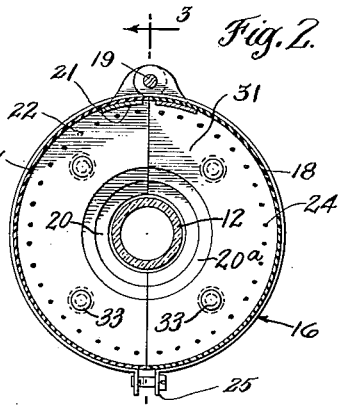
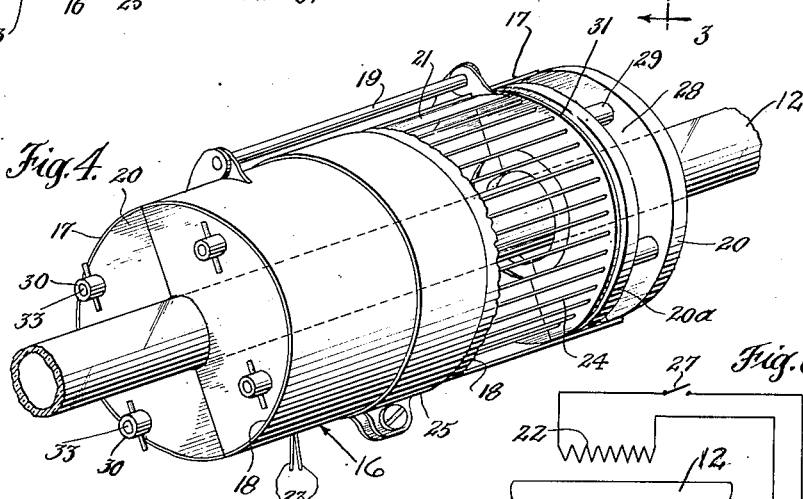
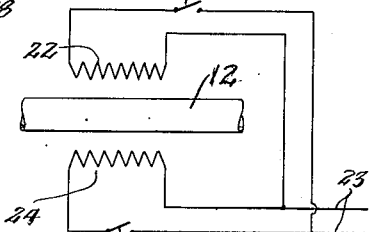
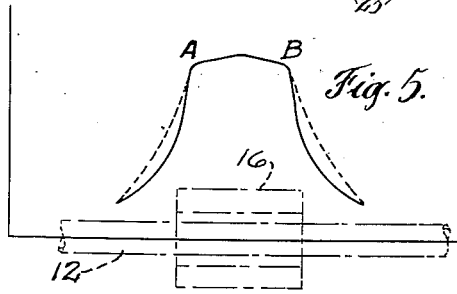
INVENTORS
ABRAM S. BERG
ARSENIUS N. GOREGLIAD
BY
Woodcock and Phelan
ATTORNEYS

UNITED STATES PATENT OFFICE 2,633,522

DEVICE FOR HEATING GLASS PIPE

Abram S. Berg and Arsenius N. Goregliad, Wyncote, Pa.

Application February 7, 1950, Serial No. 142,843

7 Claims. (Cl. 219—19)

This invention relates to a device for heating glass pipe such as that used to interconnect various parts of a chemical plant.

Glass pipe, as distinguished from steel pipe, can be cut and fitted to the exact length needed only with great difficulty. Much time, trouble, and cost can be saved if the distance involved can be spanned with a number of standard-length sections of pipe without cutting any of them to exact length. As will be described more fully hereinafter, lateral bending of the pipe in many cases can be substituted for the shortening or lengthening thereof provided such bending can be done without breaking the pipe either immediately or subsequent to its fitting due to more or less permanent stresses established therein.

Although it has long been known that various kinds of glass, including the hard glass usually employed in making glass pipe, could be made pliant by heating, the lateral bending of glass pipe under conditions such as those encountered in installing it in chemical plants by heating only that portion of the pipe which is to be bent have not been successful due to excessive pipe breakage. It has long been understood that glass objects are less likely to break if they are uniformly heated than if only portions thereof are heated. This principle obviously is inapplicable where long glass pipe lines are involved since it is there necessary that only a portion of the glass be heated to the softening point.

It has also been supposed that wherever only a portion of a glass object is heated the variation in temperature along the glass must be very gradual, rather than abrupt, to avoid breakage. The importance of this long temperature gradient is emphasized in United States Patent No. 2,135,775 where, however, the unheated portions of the glass objects are quite small so that the temperature thereof will rise substantially due to heat conduction along the glass from the heated portion thereof. The present invention is directed to the problem of heating to the softening point without breakage a portion of a long glass pipe line which must remain at a much lower temperature except in the region immediately adjacent the heated portion thereof and where a long temperature gradient cannot be employed, in some cases, because of space limitations. Contrary to the prior concept, a rather abrupt but uniform temperature change along the glass pipe is deemed advantageous, in accordance with the invention, for reasons set forth more fully hereinafter.

In accordance with one aspect of the invention, and as an object thereof, breakage of glass pipe is prevented or reduced by heating a portion thereof to the softening point with closely adjacent portions at lower temperature by maintaining an accurately uniform variation in temperature from the hot portion to the cooler portion. Briefly stated, this object is achieved by controlling the application of heat to and the ventilation of the section of pipe along which the temperature variation occurs, as described hereinafter.

A further object of the invention is to accomplish uniform bending along a short length of glass pipe in order to avoid making an abrupt bend at one point. Otherwise breakage of the glass may occur due in part to the thinning of the outer wall at the point of bending and in part to the excessive stresses established in the glass by such sharp bending. This object is of importance even where only slight bending is done as will be apparent from the following example. Suppose that a one-inch diameter glass pipe is bent through an angle of 10° by heating to the softening point only a ¼ inch length thereof, the adjacent portions of pipe being heated to a somewhat lower temperature. The stretching of the outside of the bend will reduce the wall thickness thereof more than 30 per cent and this thinning would be increased by larger pipe sizes or larger bending angles.

In order to accomplish the above-mentioned uniform bending along a length of glass pipe it should be heated to a uniform temperature in that region, and a further object of the invention is to heat uniformly a length of glass pipe which is to be bent.

A further object of the invention is to limit the region in which strains are produced by heating and bending a glass pipe to the region in which these strains subsequently will be relieved by annealing. To this end radiant heating is employed, rather than the conduction heating heretofore contemplated, for reasons discussed hereinafter. It is well known that a glass pipe can be bent and strains established therein at temperatures below that at which strains will be relieved in a reasonably short time by annealing. Thus if a glass pipe is bent when one region thereof is heated beyond the softening point with adjacent regions of substantial length heated barely to the softening point and the pipe allowed to cool from this temperature condition gradually, strains established at the highest temperature region may be relieved adequately to prevent breakage, but in the marginally heated adjacent regions excessive strains may persist unless the cooling is unduly prolonged. For a quantitative description of these matters reference is made to the book titled "Procedures in Experimental Physics" by Strong, and others, published by Prentice-Hall, Inc.

In accordance with the invention a predetermined length of glass pipe is heated to and slightly beyond the softening point with the temperature along the pipe decreasing to substantially room temperature within a relatively short distance thereby limiting to this short distance the region of marginal heating in which stresses must be relieved adequately by prolonged annealing. As previously mentioned, this rather abrupt but very accurately uniform decrease in temperature permits the bend to be made closely adjacent tanks or other objects which preclude the possibility of a long temperature gradient along the pipe.

Other objects and advantages of the invention will be apparent from the following more detailed description thereof with reference to the accompanying drawings, in which:

Fig. 1 is a fragmentary plan view of a typical embodiment of the invention;

Fig. 2 is a vertical sectional view of apparatus embodying the invention;

Fig. 3 is a sectional view taken along the line 3—3 in Fig. 2;

Fig. 4 is a perspective view of the apparatus illustrated in Figs. 2 and 3, portions thereof being shown broken away;

Fig. 5 is a diagram useful in explaining the invention; and

Fig. 6 is a schematic electrical diagram of the invention.

Pipe section 10 is connected at one of its ends to apparatus such, for example, as a tank, not shown, and at its other end to elbow 11 thence to pipe section 12 which in turn is connected to pipe section 13 by any suitable connecting means. Pipe section 14 may be connected at one of its ends to some apparatus such, for example, as another tank, not shown, with its other end intended for connection to pipe section 13. The spacing between the aforesaid tanks and the length of the various pipe sections and of elbow 11, as prefabricated to standardized dimensions, are such that the adjacent ends of pipe sections 13 and 14 are separated by a short distance longitudinally and laterally of the pipe line. However, it will be apparent that the connection between pipe sections 13 and 14 can be made if pipe section 10 is bent slightly at heater 15 and if pipe section 12 is bent at heater 16 so that the right-hand portion of the pipe line shown in Fig. 1 occupies the position shown approximately by dot-and-dash lines therein. The various pipe sections and elbow 11 preferably are made of some hard glass such as Pyrex.

Heater 16, which may be similar to heater 15, comprises a pair of heat-insulating covers 17 and 18 hinged together by pin 19 and hinge members 21 to encompass pipe 12 or to be removed therefrom. Semicircular insulator plates 31 by which covers 17 and 18 are supported have semicircular internal openings somewhat larger than the largest pipe to be bent. Heating element 22, comprising resistance wire threaded between opposite insulator plates 31, is connected to any suitable source of electrical power, such as line 23. Insulator plates 31 may be made of sheet asbestos or other similar material. Heating element 24, similar to element 22, is threaded between other opposite insulator plates 31 and also connected to power line 23.

In operation the two halves of heater 16 are opened about hinge pin 19, placed around pipe 12, and closed and firmly held by clamp 25. When power is applied to heating elements 22 and 24, pipe 12 is heated solely by radiation since the heating elements are protected from air currents and insulator plates 31 are good thermal insulators. Since elements 22 and 24 are spaced some distance from pipe 12 their strands may be spaced apart substantially without objectionable variation of the temperature of pipe 12 circumferentially thereof. Likewise, the joint between the two halves of heater 16, represented by covers 17 and 18, causes no appreciable irregularity in heating as it would do if the heating elements were in close proximity to pipe 12 in accordance with previous practice in the electrical heating of glass tubing as illustrated in the aforesaid Patent No. 2,135,775.

The radiant heating of pipe 12, in accordance with the invention, is advantageous for a number of other reasons. It saves time since glass pipe may be heated at a high rate by the diffuse heat from a radiant heater which is at a very much higher temperature than that of the pipe. If conduction heating were employed with a heating element in more or less firm contact with the glass pipe, hot spots in the glass pipe would cause breakage if the temperature of the element were much higher than that of the glass. It is well known that convection heating would also be too uneven.

An even more important advantage of radiant heating becomes effective during the annealing of the glass pipe after bending. It has heretofore been known that such annealing could be accomplished most effectively by merely discontinuing the application of heat to the pipe without disturbing the pipe and heater. Where either conduction or convection heating is employed, however, heat flows away from the glass pipe during annealing by the reverse operation of the same method by which it was applied, and this is objectionable because it results in uneven cooling of the pipe and because it results in faster cooling, both factors tending to cause pipe breakage. On the other hand, with radiant heating in accordance with the invention, cooling of the glass pipe is prolonged for effective annealing thereof and it is very uniform over the heated portion since there is very little heat flow from the hot pipe except by conduction along the pipe itself.

The difference between conduction heating and radiant heating in relation to the annealing of glass pipe will be better understood when it is recalled that flow of heat by conduction is proportional to the difference between the first power of the temperatures of the two points involved. Thus when electric power is turned off from a heater in contact with glass pipe, heat flows rapidly from the pipe to the heater as soon as it cools below the temperature of the pipe. Heat transfer by radiation, on the other hand, is proportional to the difference between the fourth powers of the two temperatures and, therefore, is relatively ineffective for small temperature differences. Thus, during radiant heating, a relatively large temperature difference between the heater and the glass pipe is required, and the small temperature difference that may occur during cooling is quite ineffective to transfer heat from the pipe. Since the thermal conductivity of glass is very low, and since in accordance with the invention dead-air spaces are provided along the pipe at the ends of the heated region to reduce heat flow therealong by conduction, the heated portion of the pipe is thermally isolated to prolong the annealing period.

The portion of pipe 12 within the dead-air space between heating elements 22 and 24, being exposed to radiation from the elements and substantially wholly protected from air currents, will be heated approximately uniformly as indicated by the solid line from A to B in Fig. 5. However a point on pipe 12 opposite the middle of the heater will be at a slightly higher temperature than the points under the ends of the heater, as shown by the aforesaid line in Fig. 5, for the reasons, first, that somewhat more heat is received by the middle point and, second, the heat flow therefrom by conduction through pipe 12 will be less than at the ends.

It is therefore desirable that pipe sections 10, 12, and 13 be firmly supported by any suitable means, such as supports 25, until sufficient heat has been applied to pipe 12 by heater 16 so that the temperature of the pipe under the middle of the heater is raised somewhat above the softening point of the glass and until the portions of pipe 12 under the ends of heater 16 are sufficiently soft to bend readily. When pipe section 10 is similarly heated by heater 15 supports 26 are removed and pipe sections 13 and 14 are connected by bending as necessary pipe sections 12 and 10.

Switches 27 are then opened and the pipes and heaters are allowed to cool without being disturbed thereby annealing to remove strain therefrom the heated portions of pipes 10 and 12. Heaters 15 and 16 may be supported during heating and cooling by any convenient means such as chain slings, not shown. If desired any suitable time switch, not shown, might be substituted for switches 27 to apply power to heaters 15 and 16 for a predetermined time thereby to heat pipe sections 10 and 12 to a predetermined temperature.

As thus far described the aforesaid objects of the invention would be accomplished imperfectly in that, first, the temperature gradient lengthwise of the pipe at the end of heater 16 would not be sufficiently uniform in some cases, and, second, undesirable air currents would flow along pipe 12 within and near heater 16 during heating and cooling thereby producing a non-uniform circumferential distribution of temperature. To control this temperature gradient at the ends of heater 16, semicircular end plates 20 and 20a, made of any suitable heat-insulating material, are attached to plates 31 by spacers 29 and 32, thumb screws 30, and studs 33. Spacers of different lengths may be employed to position plates 20 and 20a as desired.

It is contemplated that heater 16 shall be adapted for heating glass pipes having a substantial range of diameters, say from ½ inch to 3 inches outside diameter. To accommodate these various pipe sizes special end plates 20 and 20a should be utilized for each size. End plate 20 should fit closely around pipe 12 in order to prevent air circulation therebetween, but sufficient clearance must be left between pipe 12 and plate 20 to permit bending of the pipe and to allow for unequal expansion and contraction of the pipe and plate with varying temperature. In practice it has been found that a radial clearance of $\frac{1}{32}$ inch between pipe 12 and plate 20 is satisfactory for heating and bending a glass pipe having an outside diameter of 1.5 inches. If a vertical section of pipe is to be heated so that heater 16 tends to function like a chimney, the opening between the pipe and the upper one of plates 20 advantageously may be closed by some suitable material, such as shredded asbestos, thereby preventing air currents.

Spacers 32 should be quite short in order that end plates 20a shall be close to heating elements 22 and 24. End plates 20a may fit less closely around pipe 12 than end plates 20, a radial spacing of ⅛ inch being satisfactory for a pipe having an outside diameter of 1.5 inches. Thus the partially heated space 28 will raise the temperature of pipe 12 adjacent each end of heater 16 approximately as shown by the dotted portion of the curve in Fig. 5 in comparison with the temperature the pipe would have if end plates 20 were removed, represented approximately by full lines in Fig. 5.

It should be noted that the partially heated dead-air space or zone 28 functions quite differently when heater 16 and pipe 12 are being heated than when they are cooling. During heating the heat flow is sustained from heating elements 22 and 24 outward, and space 28 necessarily has a lower temperature than the middle portion of heater 16 as shown in Fig. 5. During cooling a limited quantity of heat flows outward from the whole heater and, if space 28 were better insulated, it could remain at a higher temperature than the middle portion of heater 16. In any case the temperature of space 28 relative to that of the middle portion of heater 16 will be greater during cooling than during heating, or differently stated, the rate of cooling of space 28 will be slower than the rate of cooling of the middle portion of heater 16, a fact that is significant in annealing adequately those portions of pipe 12 at the ends of heater 16 which unavoidably are marginally heated sufficiently to create excessive strains therein which otherwise might not be relieved.

While a preferred embodiment of the invention has been described it will be understood that modifications thereof may be made within the spirit and scope of the appended claims. Although the invention has been described with reference to the bending of glass pipe, it will be apparent that it may be employed to stretch or shorten the pipe slightly if desired.

What is claimed is:

1. A heater for heating by direct and unobscured radiation a section of glass pipe to be bent and subsequently conserving the heat in said section for annealing by slow and uniform cooling thereof, comprising a heating element adapted to be heated to a temperature substantially greater than that of said pipe section, thermal-insulating means for supporting said element in spaced relation to said pipe section for uniform and direct radiant heating thereof and having sufficient clearance therefrom to permit bending of said section, and a substantially airtight cover for said element and said section to substantially prevent transfer of heat to and from said section by convection, said cover including means for defining spaces adjacent the ends of said heating element and around said heating element, and heat flow connections between the end spaces and the space around said heating element including said clearance between said supporting means and said pipe said cover being supported independently of said pipe to permit free bending of said section independently of said heater and to allow free expansion and contraction thereof within said cover.

2. A heater for radiantly heating a section of glass pipe to be bent and subsequently conserving the heat in said section for annealing by slow and uniform cooling thereof, comprising a heating element adapted to be heated to a temperature substantially greater than that of said pipe section, thermal-insulating means for supporting said element in spaced relation to said pipe section for uniform and unobscured radiant heating thereof and having sufficient clearance from said pipe to permit bending thereof, and a substantially air-tight cover for said section extending axially along said pipe away from the heated section to substantially prevent transfer of heat thereto and therefrom by convection, said cover including a pair of spaced heat-insulating end plates disposed at each end thereof with sufficient clearance from said pipe section to permit bending and expansion and contraction thereof and defining substantially dead-air spaces around said pipe on each side of said heated section to achieve substantial uniformity of temperature change along said pipe and to prolong the cooling thereof for effective annealing, said heater being supported independently of said pipe with said end plates having sufficient clearance from said pipe section to permit bending and expansion and contraction thereof.

3. A heater for heating by direct radiation a section of glass pipe to be bent and subsequently conserving the heat in said section for annealing by slow and uniform cooling thereof, comprising a heating element adapted to be heated to a temperature substantially greater than that of said pipe section, thermal-insulating means for supporting said element in spaced relation to said pipe section for uniform and direct radiant heating thereof and having sufficient clearance from said pipe to permit bending thereof, and a substantially air-tight cover for said section to substantially prevent transfer of heat thereto and therefrom by convection, said cover including a pair of spaced heat-insulating end plates disposed at each end thereof defining substantially dead-air spaces therebetween, the outermost of said end plates fitting closely about said pipe to prevent escape of heat therebetween, the inner ones of said end plates fitting less closely about said pipe than said outermost end plates for restricted passage of heat between said inner end plates and said pipe thereby partially heating the outermost of said dead-air spaces to achieve substantial uniformity of temperature change along said pipe and to prolong the cooling thereof for effective annealing, both pairs of said end plates having sufficient clearance from said pipe freely to permit bending and expansion and contraction of said pipe, and said heater being supported independently of said pipe.

4. A heater for radiantly heating a section of glass pipe to be bent and subsequently conserving the heat in said section for annealing by slow and uniform cooling thereof, comprising a heating element adapted to be heated to a temperature substantially greater than that of said pipe section, thermal-insulating means for supporting said element in spaced relation to said pipe section for uniform and direct radiant heating thereof and having sufficient clearance therefrom to permit bending thereof, and a substantially air-tight cover for said section to substantially prevent transfer of heat thereto and therefrom by convection, said cover including heat-insulating end plates disposed at opposite ends thereof and axially spaced from the ends of said heating element defining a substantially dead-air space extending axially along said pipe beyond the section thereof to be bent, said end plates fitting closely about said pipe for preventing passage of heat from said dead-air space to achieve substantial uniformity of temperature change along said pipe and to prolong the cooling thereof for effective annealing, said cover being supported independently of said pipe and said pipe section being free to bend and to expand and to contract independently of said cover.

5. A heater for radiantly heating a section of glass pipe to be bent and subsequently conserving the heat in said section for annealing by slow and uniform cooling thereof, comprising a heating element adapted to be heated to a temperature substantially greater than that of said pipe section, thermal-insulating means for supporting said element in spaced relation to said pipe section for uniform and direct radiant heating thereof and being spaced from said pipe sufficiently to permit bending said pipe, and a substantially air-tight cover for said section to substantially prevent transfer of heat thereto and therefrom by convection, said cover including a plurality of spaced heat-insulating end plates disposed at opposite ends thereof defining substantially dead-air spaces therebetween, the outermost of said end plates fitting closely about said pipe to prevent escape of heat therebetween, the inner ones of said end plates fitting less closely about said pipe than said outermost end plates for restricted passage of heat between said inner end plates and said pipe thereby partially heating the outermost of said dead-air spaces to achieve substantial uniformity of temperature change along said pipe and to prolong the cooling thereof for effective annealing, said heater being supported independently of said pipe and said section of pipe being free to bend and to expand and to contract independently of said heater.

6. A heater for radiantly heating a section of glass pipe to be bent and subsequently conserving the heat in said section for annealing by slow and uniform cooling thereof, comprising a heating element adapted to be heated to a temperature substantially greater than that of said pipe section, thermal-insulating means for supporting said element in spaced relation to said pipe section for uniform and direct radiant heating thereof and being spaced from said pipe sufficiently to permit bending of said pipe section, and a substantially air-tight cover for said element and said section to substantially prevent transfer of heat to and from said section by convection, said cover including a plurality of spaced heat-insulating end plates disposed at opposite ends thereof defining substantially dead-air spaces therebetween, the outermost of said end plates fitting closely about said pipe to prevent escape of heat therebetween, the inner ones of said end plates fitting less closely about said pipe than said outermost end plates for restricted passage of heat between said inner end plates and said pipe thereby partially heating the outermost of said dead-air spaces to achieve substantial uniformity of temperature change along said pipe and to prolong the cooling thereof for effective annealing, said heater being supported independently of said pipe and said section of pipe being free to bend and to expand and to contract independently of said heater.

7. A device for heating and annealing a partially installed section of glass pipe which requires bending to a final installed position comprising a housing defining an enclosure through which a pipe section freely extends, radiant-heating elements for heating said section to an elevated temperature substantially above the softening point of the glass, low thermal conductivity members for supporting said elements within said housing in concentric spaced relation to said pipe for heat exchange therewith substantially solely by radiation said members being axially spaced for freedom of bending of the heated pipe intermediate the ends of said housing, said housing extending axially beyond said members to form partial heating zones at each end of the heated section for annealing the stressed pipe, said zones being defined at each end of said housing by end plates for said housing and said members and said zones being in communication with the heated portion of said housing to provide a sharp temperature gradient in the pipe adjacent each end of the housing during heating of the pipe to bending temperature and to reduce the rate of temperature decrease during annealing in avoidance of localized stresses.

ABRAM S. BERG.
ARSENIUS N. GOREGLIAD.

REFERENCES CITED

The following references are of record in the file of this patent:

UNITED STATES PATENTS

| Number | Name | Date |
|---|---|---|
| 1,147,396 | Hawley et al. | July 20, 1915 |
| 1,426,187 | Harrison | Aug. 15, 1922 |
| 1,864,666 | Osborne | June 28, 1932 |
| 2,135,775 | Walker | Nov. 8, 1938 |
| 2,426,976 | Taulman | Sept. 2, 1947 |